(12) United States Patent
Kanamori

(10) Patent No.: US 7,173,740 B2
(45) Date of Patent: Feb. 6, 2007

(54) IMAGE FORMING APPARATUS

(75) Inventor: Keiko Kanamori, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1010 days.

(21) Appl. No.: 10/284,124

(22) Filed: Oct. 31, 2002

(65) Prior Publication Data
US 2004/0085589 A1 May 6, 2004

(51) Int. Cl.
*G06K 15/00* (2006.01)
(52) U.S. Cl. .................. 358/3.24; 358/3.26; 358/3.27; 382/173
(58) Field of Classification Search ...... 358/3.24–3.27, 358/374
See application file for complete search history.

(56) References Cited

U.S. PATENT DOCUMENTS

2005/0174611 A1* 8/2005 Konno ....................... 358/474

* cited by examiner

*Primary Examiner*—Edward Coles
*Assistant Examiner*—Heather D Gibbs
(74) *Attorney, Agent, or Firm*—Foley & Lardner LLP

(57) ABSTRACT

This invention provides a system which can obtain the same output irrespective of a reading system by previously storing different parameters used at the image processing times for respective reading systems and performing image processing operation by selectively using one of the parameters corresponding to the reading system used even in a case where different reading systems such as a through read system and document table fixed type system are provided to read a color document.

11 Claims, 8 Drawing Sheets

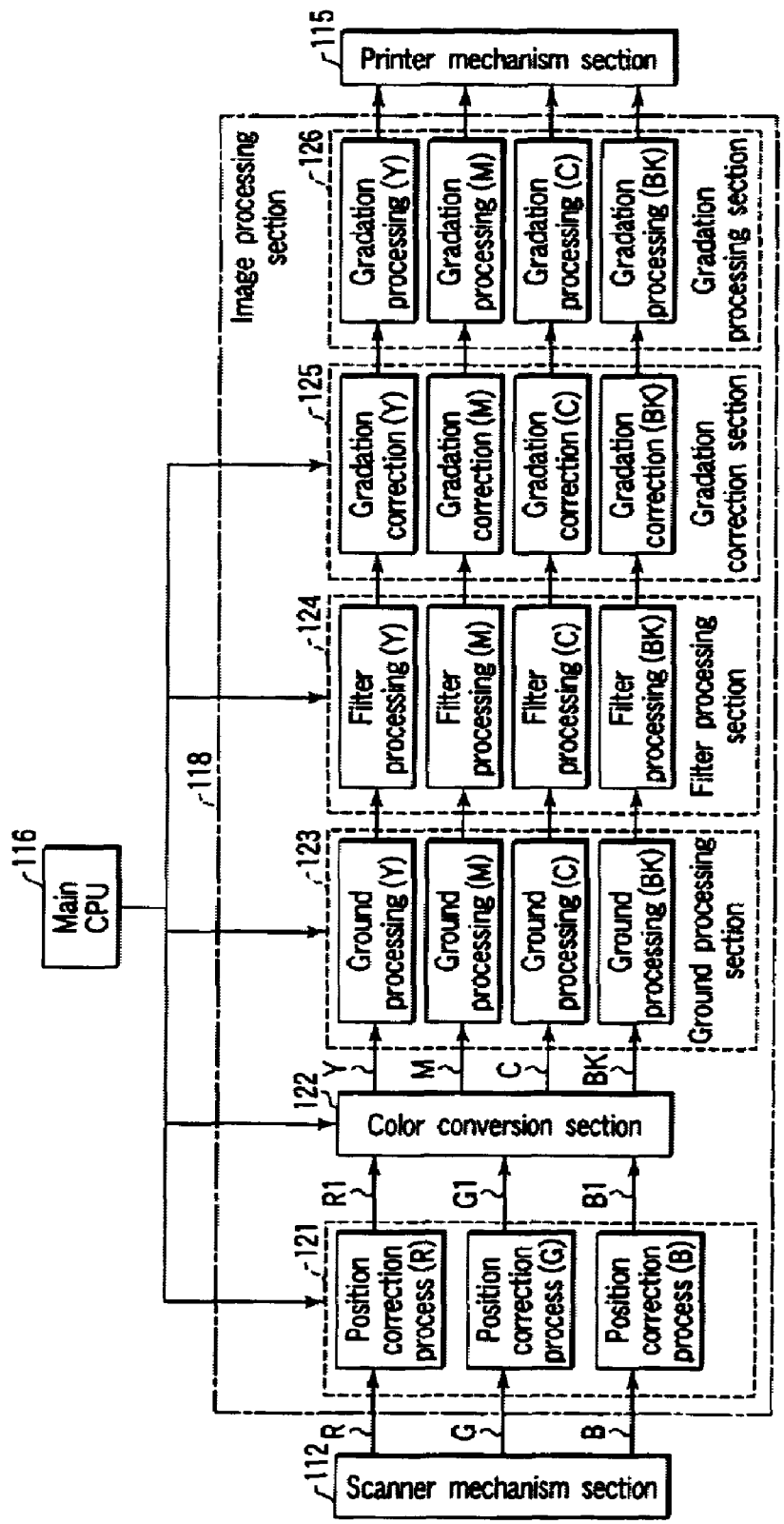
F I G. 2

IMAGE FORMING APPARATUS

BACKGROUND OF THE INVENTION

This invention relates to an image forming apparatus such as a full color copying machine or color printer multi-function machine.

Generally, there are provided a plurality of methods for reading document data, particularly, in a scanner section of a document image processing apparatus which deals with image information.

For example, a method for reading document data while the document is being moved as in a facsimile machine (which is hereinafter referred to as a through read system), a method for reading document data while a carriage having the scanner section provided in the scanner is being moved without moving the document as in a flat bed scanner (which is hereinafter referred to as a document table fixed type system), a method for reading document data while the document table itself is being moved (which is hereinafter referred to as a document table moving type system), a method which is not generally used, for reading document data while the document is wound on a drum, and the like are provided.

Further, in the copying machine, there is provided a system in which documents are automatically drawn onto the document table one by one by an automatic document feeder (ADF) and the scanner section of a scanner is operated when the document is supplied on the document table. Thus, it becomes possible to copy a plurality of documents and input an image without much trouble.

However, since a document is drawn onto the document table and set still on the document table and then the document image is scanned and input when a plurality of documents are sequentially supplied by use of the automatic document feeder, it is necessary to temporarily fix the document on the document table. Therefore, it takes a lot of time to perform a series of processes and a bottleneck (difficulty) occurs when the operation speed is enhanced.

If the through read system is used as the document input system by use of the ADF in order to solve the above problem, it becomes unnecessary to keep the document still on the document table and it is possible to enhance the reading speed. At this time, the document placed on the document table can be scanned and read by the document table fixed type system without using the ADF.

However, if the document is scanned while it is being drawn at high speed by use of the through read system, the document will float or it may be warped or bent since it is moved so that the image density, color and sharpness will become different from those obtained by use of the document table fixed type system. That is, there occurs a problem that the same input information cannot be acquired if the document input system is changed.

As a measure to cope with the above problem, it is proposed that data is subjected to the reflectance ratio correction process immediately after the data is read by the scanning section of the scanner in a case where the document image is input in a monochrome signal form by use of the through read system. Simply by performing the above process, substantially the same signal as input data acquired when the document table fixed type system is used can be acquired without changing image process parameters used after the above process (Patent Application No. 2000-371889).

However, in a case where the document image is input in a color signal form by use of the through read system, there occurs a problem that RGB input values are simply individually changed and the resultant color will become different from the color which is originally desired even if color information items of three colors of R (red), G (green), B (blue) are subjected to the reflectance ratio correction process, for example. Thus, if the same process is performed as in the case wherein the document image is input in a monochrome signal form, the same output with the image density, color reproduction, sharpness and the like as that obtained in the case of the document table fixed type system cannot be attained.

That is, color signals of yellow (Y), magenta (M), cyan (C), black (B) used when data is printed will become different when the document supplied by the ADF is read by use of the through read system and when the document placed still on the document table is read.

BRIEF SUMMARY OF THE INVENTION

An object of the present invention is to acquire the same output irrespective of the reading system when the reading systems such as the through read system and document table fixed type system used to read a color document are different.

In order to attain the above object, an image forming apparatus of the present invention comprises a reading section which has a first reading function of reading a document image fed and a second reading function of moving along a document placed on a document table to read an image of the document, determining means for determining whether the document is read by use of the first reading function of the reading section or the second reading function of the reading section, a correcting section which corrects image data acquired by use of the first reading function of the reading section by use of first correction data which is previously stored when the determining means determines that the document is read by use of the first reading function of the reading section and corrects image data acquired by use of the second reading function of the reading section by use of second correction data which is previously stored when the determining means determines that the document is read by use of the second reading function of the reading section, and an image forming section which forms an image based on image data corrected by the correcting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1, 2 are block diagrams showing the schematic configuration of an image forming apparatus.

DETAILED DESCRIPTION OF THE INVENTION

There will now be described an image forming apparatus according to an embodiment of this invention with reference to the accompanying drawings.

Figure 1:
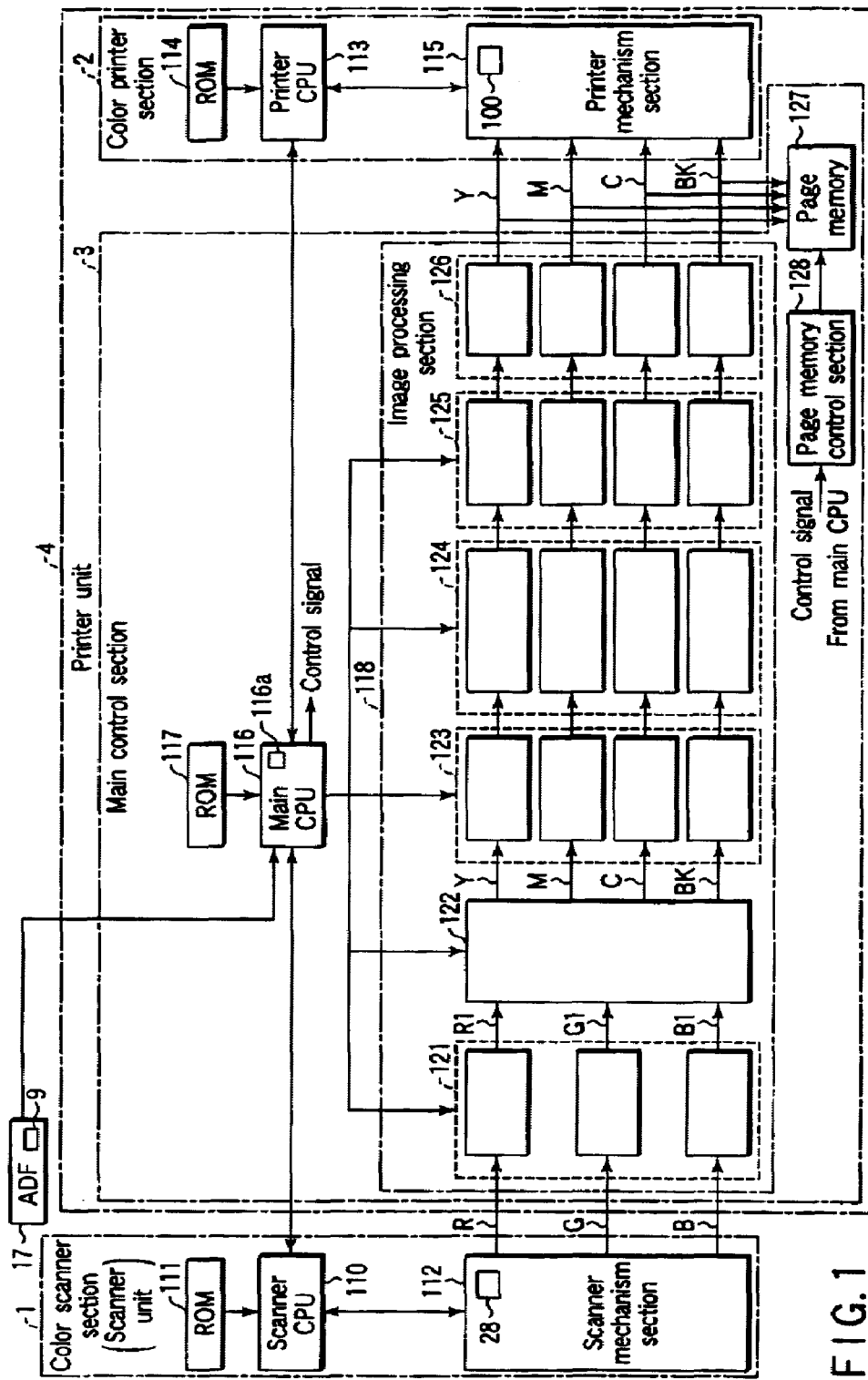

FIGS. 1, 2 show the internal configuration blocks of an image forming apparatus such as a color digital copying apparatus according to the present invention which reads a color image on a document and forms a copy image thereof. The image forming apparatus is roughly configured by a color scanner section (scanner unit) 1 used as image reading means for reading and inputting a color image on a document, and a printer unit 4 including a color printer section 2 used as image forming means for forming a copy image of the input color image and a main control section 3 which controls the whole portion of the image forming apparatus.

The main control section 3 controls the whole portion of the color digital copying apparatus.

The color scanner section 1 reads image information of an object to be copied (not shown) placed on a document table by use of an automatic document feeder (ADF) 17 as the brightness of light to form image data (R: red, G: green, B: blue).

The color scanner section 1 includes a scanner CPU 110 which controls the whole portion thereof, a ROM 111 in which a control program or the like is stored, a data storing RAM (not shown), and a scanner mechanism portion 112.

The scanner mechanism portion 112 includes an optical system which scans and reads a document, a moving mechanism which moves the optical system along the document table, a color image sensor which is supplied with a document image by the optical system and converts the document image into image data items of respective colors, and an image correcting section which corrects image data output from the color image sensor.

The color printer section 2 includes a printer CPU 113 which controls the whole portion thereof, a ROM 114 in which a control program or the like is stored, a data storing RAM (not shown), and a printer mechanism section (IMC) 115.

The printer mechanism section 115 is configured by printers which perform the printing operation based on image data items (Y, M, C, BK) of respective colors subjected to color separation by an image processing section (IMG) 118 which will be described later. Each printer includes a photosensitive drum used as an image carrier, an electrifying device which electrifies the surface of the photosensitive drum, an exposure device having a semiconductor laser oscillator whose light emission operation is controlled based on image data (Y, M, C, BK) of a corresponding one of colors subjected to the color separation process and forming an electrostatic latent image on a corresponding one of the photosensitive drums, a developing device which develops the electrostatic latent image as a toner image on the photosensitive drum, a feeding mechanism which feeds paper used as an object to be copied, a transfer device which transfers the toner image on the photosensitive drum onto the paper fed by the feeding mechanism, and a fixing device which thermally fixes the toner image transferred onto the paper by the transferring device.

The main control section 3 includes a main CPU 116 which controls the whole portion thereof, a ROM (read only memory) 117 in which a control program or the like is stored and an image processing section (IMG) 118 which performs the color conversion process or filter process with respect to image data items which are input from the color scanner section 1 and color-separated into red (R), green (G), blue (B) and outputs print data to the color printer section 2.

Although not shown in the drawing, the main control section 3 further includes a RAM which temporarily stores data, an NVRAM (nonvolatile random access memory) which is a battery-backed-up nonvolatile memory, a common RAM used to allow bi-directional communication between the main CPU 116 and the printer CPU 113, a page memory 127 having an area in which image information of plural pages can be stored and formed to store data obtained by compressing image information from the color scanner section 1 for each page, and a page memory control section 128 which stores or reads out image information with respect to the page memory 127.

The image processing section 118 includes a position correction processing section 121, color conversion section 122, ground processing section 123, filter processing section 124, gradation correction processing section 125 and gradation processing section 126.

The position correction processing section 121 is supplied with data of 8-bit multivalued levels as image data of red, green, blue supplied from the color scanner section 1 and corrects positional deviation occurring due to bending or inclination of the document when the document is read by use of the through read system. That is, it corrects the positional deviation which is minute but is large enough to cause a problem when the image is processed (for example, when the reading resolution of the color scanner section 1 is 600 dpi, an extremely large influence is caused in the image processing operation even by a positional deviation of one pixel=1/24 mm). When the document is read by use of the document table fixed type system, the position correction processing section 121 outputs image data supplied without making the above correction to the color conversion section 122.

The color conversion section 122 corrects variation in color caused by floating of the paper, for example, with respect to image data supplied from the position correction processing section 121. The color conversion section 122 converts image data of red (R), green (G), blue (B) into image data of cyan (C), magenta (M), yellow (Y), black (BK) by use of a parameter corresponding to the through read system or a parameter corresponding to the document table fixed type system. At the same time, the color conversion section 122 corrects the color drift and, for example, it corrects a reddish achromatic color (white, black) to gray or corrects a dark color into a bright color. Image data output from the color conversion section 122 is supplied to the ground processing section 123.

Even if the reading systems used are different, parameters which attain the same color reproduction at the output time are formed. For example, as the color conversion method, a method for defining values of image data items of C, M, Y after conversion with respect to all of the combinations (256×256×256=16,777,216) of values of 0 to 255 of image data items of R, G, B is generally used and formation of the parameters depends on the way of setting the values of the image data items of C, M, Y output. The image data of BK is formed based on the image data items of C, M, Y.

Next, the parameter changing method of the color conversion section 122 is explained.

In the color conversion process, C, M, Y are derived based on R, G, B by combining three equations as follows. At this time, the parameter correction is made when the scan condition is changed by changing $S_{00}$ to $S_{23}$ appearing at the first time.

It becomes unnecessary to change the parameters of D, F in the latter two equations by absorbing the changed part.

$$\begin{bmatrix} R'_i \\ G'_i \\ B'_i \end{bmatrix} = \begin{bmatrix} s_{00} & s_{01} & s_{02} & s_{03} \\ s_{10} & s_{11} & s_{12} & s_{13} \\ s_{20} & s_{21} & s_{22} & s_{23} \end{bmatrix} \begin{bmatrix} R_i \\ G_i \\ B_i \\ 255 \end{bmatrix} \quad (1)$$

↑ parameters in this portion are changed to cope with the process

By respectively reading $R_i = R_i^1$, $G_i = G_i^1$, $B_i = B_i^1$, the following equation is obtained.

$$\begin{bmatrix} L^{*\prime}_i \\ a^{*\prime}_i \\ b^{*\prime}_i \end{bmatrix} = 100^* \begin{bmatrix} D_{00} & D_{01} & D_{02} & D_{03} & D_{04} & D_{05} & D_{06} & D_{07} & D_{08} & D_{09} \\ D_{10} & D_{11} & D_{12} & D_{13} & D_{14} & D_{15} & D_{16} & D_{17} & D_{18} & D_{19} \\ D_{20} & D_{21} & D_{22} & D_{23} & D_{24} & D_{25} & D_{26} & D_{27} & D_{28} & D_{29} \end{bmatrix} \begin{bmatrix} R_i \\ G_i \\ B_i \\ R_i^2 \\ G_i^2 \\ B_i^2 \\ R_i G_i \\ G_i B_i \\ B_i R_i \\ 1 \end{bmatrix}$$

By respectively reading $L^{*11}_i = L^{*1}_i$, $a^{*11}_i = a^{*1}_i$, $b^{*11}_i = b^{*1}_i$, the following equation is obtained.

$$\begin{bmatrix} C' \\ M' \\ Y' \end{bmatrix} = \begin{bmatrix} F_{00} & F_{01} & F_{02} & F_{03} & F_{04} & F_{05} & F_{06} & F_{07} & F_{08} & F_{09} \\ F_{10} & F_{11} & F_{12} & F_{13} & F_{14} & F_{15} & F_{16} & F_{17} & F_{18} & F_{19} \\ F_{20} & F_{21} & F_{22} & F_{23} & F_{24} & F_{25} & F_{26} & F_{27} & F_{28} & F_{29} \end{bmatrix} \begin{bmatrix} L^{*\prime\prime}_i \\ a^{*\prime\prime}_i \\ b^{*\prime\prime}_i \\ L^{*\prime\prime 2}_i \\ a^{*\prime\prime 2}_i \\ b^{*\prime\prime 2}_i \\ L^{*\prime\prime}_i a^{*\prime\prime}_i \\ a^{*\prime\prime}_i b^{*\prime\prime}_i \\ b^{*\prime\prime}_i L^{*\prime\prime}_i \\ 1 \end{bmatrix}$$

Thus, C, M, Y are derived.

Figure 3:
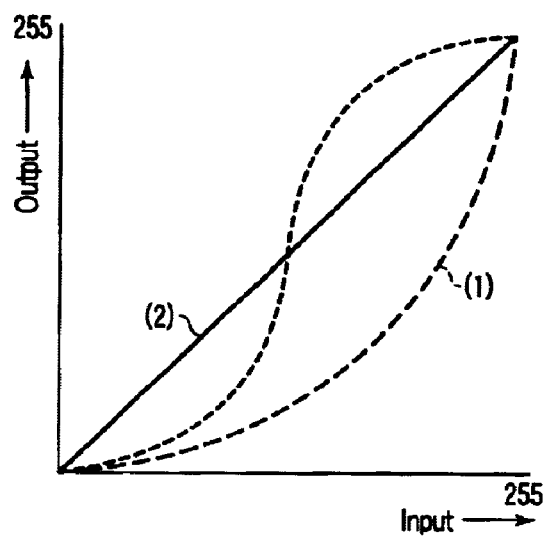
FIG. 3 is a diagram showing different correction parameters for respective reading systems in a ground correcting section.

The ground processing section 123 eliminates fog (vagueness) of the ground which occurs due to floating of the document from the image data supplied from the color conversion section 122 by use of a parameter corresponding to the through read system or a parameter corresponding to the document table fixed type system. As shown in FIG. 3, as correction in the ground processing section 123, various corrections can be carried out depending on the situation, but in this case, respective colors are processed by use of the same parameter so as to maintain the color balance by taking into consideration that the color correction has been carried out in the color conversion section 122. For example, (1) of FIG. 3 is selected in the through read system and (2) of FIG. 3 is selected in the document table fixed type system. Image data output from the ground processing section 123 is supplied to the filter processing section 124.

Figure 4:
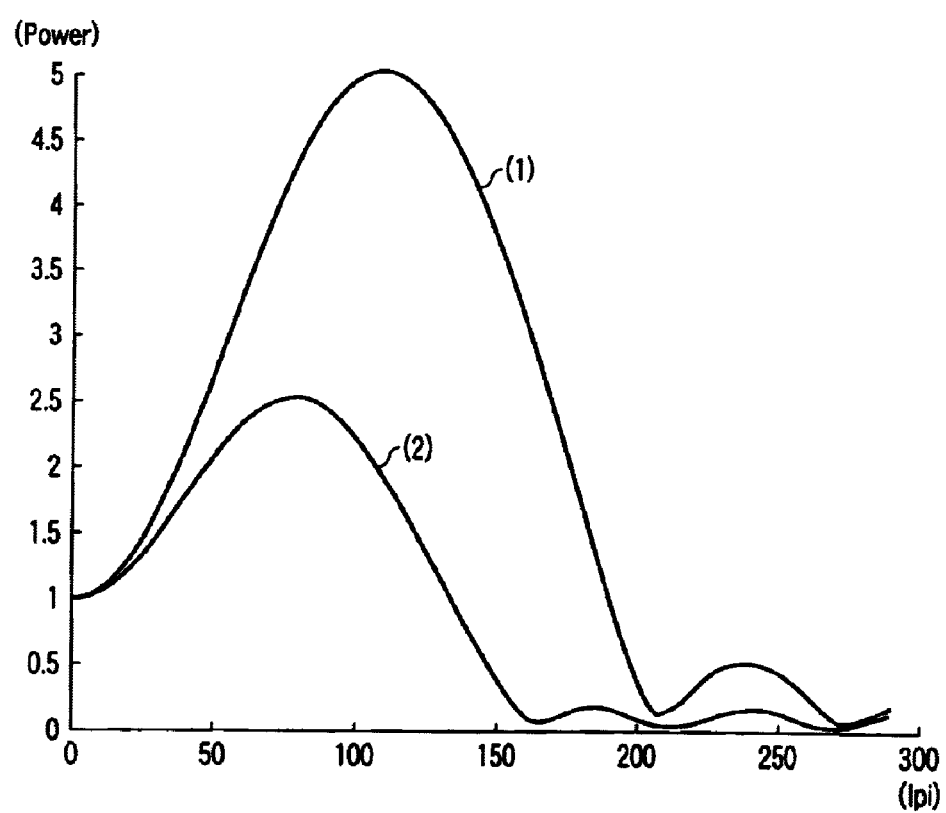
FIG. 4 is a diagram showing different correction parameters for respective reading systems in a filter section.

The filter processing section 124 performs the filter process to enhance sharpness and eliminate moire by use of a parameter ((1) of FIG. 4) corresponding to the through read system or a parameter ((2) of FIG. 4) corresponding to the document table fixed type system. Image data output from the filter processing section 124 is supplied to the gradation correction processing section 125.

Figure 5:
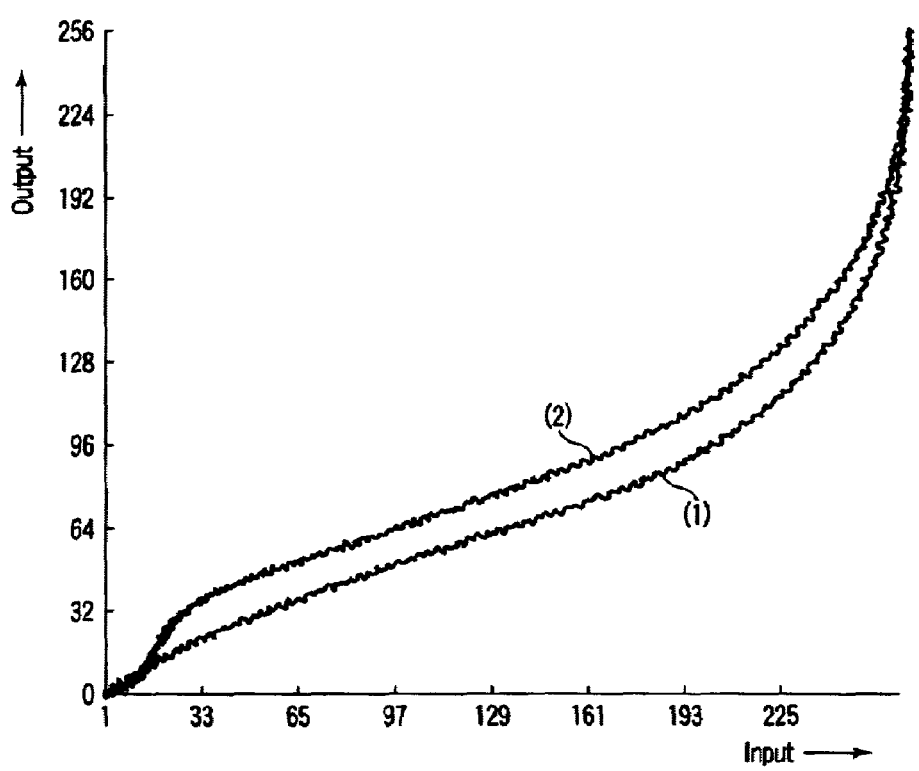
FIG. 5 is a diagram showing different correction parameters for respective reading systems in a gradation correcting section.

The gradation correction processing section 125 makes a correction of the gradation characteristic which could not be corrected by the processing blocks in the preceding stage of the gradation correction processing section 125 and a correction of the γ characteristic of the printer section 2 with respect to image data supplied from the filter processing section 124 by use of a parameter ((1) of FIG. 5) corresponding to the through read system or a parameter ((2) of FIG. 5) corresponding to the document table fixed type system. Image data output from the gradation correction processing section 125 is supplied to the gradation processing section 126.

The gradation processing section 126 subjects image data supplied from the gradation correction processing section 125 to the gradation process such as a full-line process, dither process or error dispersing process which can serve the desired purpose. Image data output from the gradation processing section 126 is supplied to the page memory 127.

Figure 6:
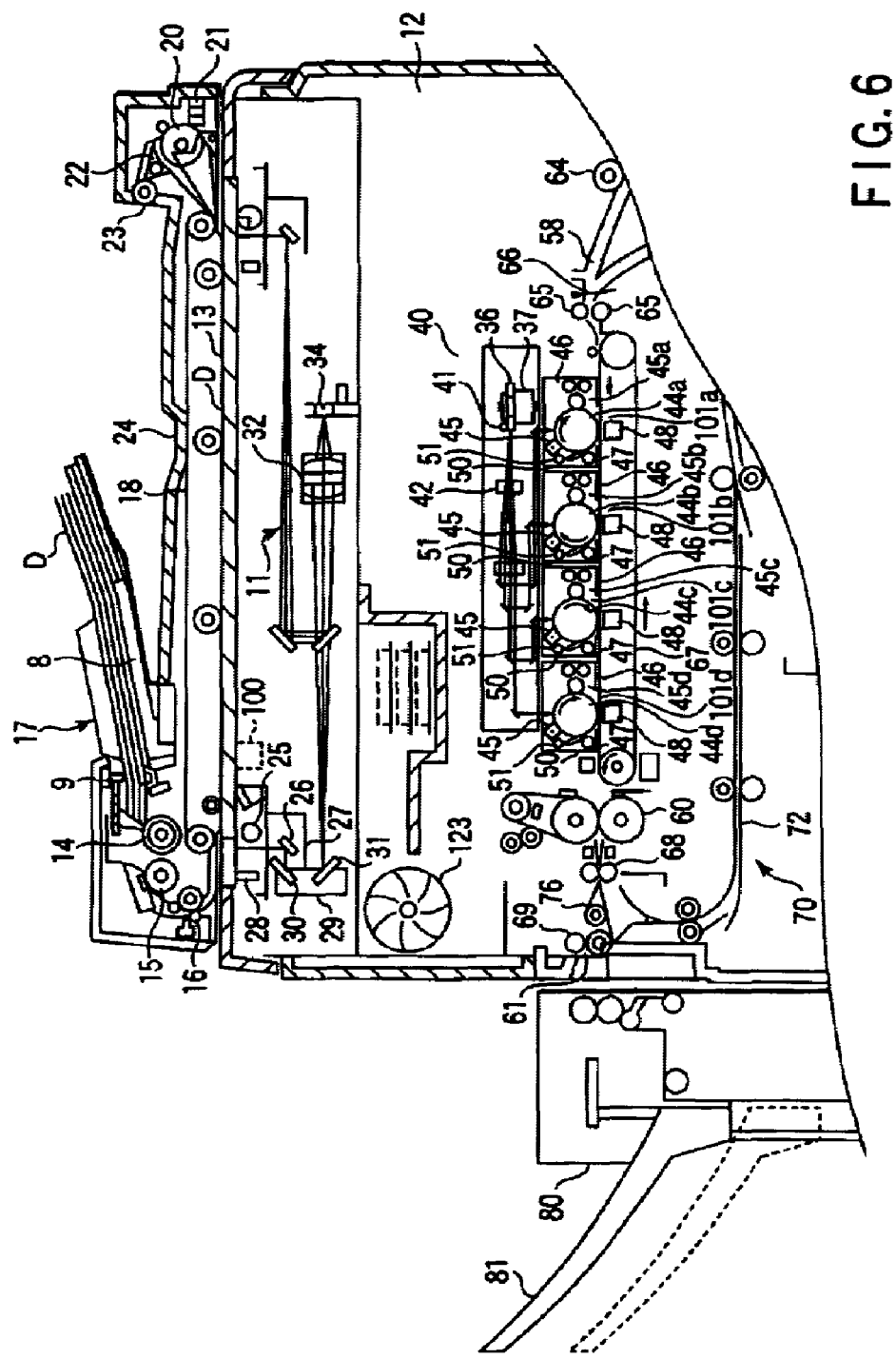
FIGS. 6, 7 are cross-sectional views showing the schematic configuration of the image forming apparatus.
Figure 7:
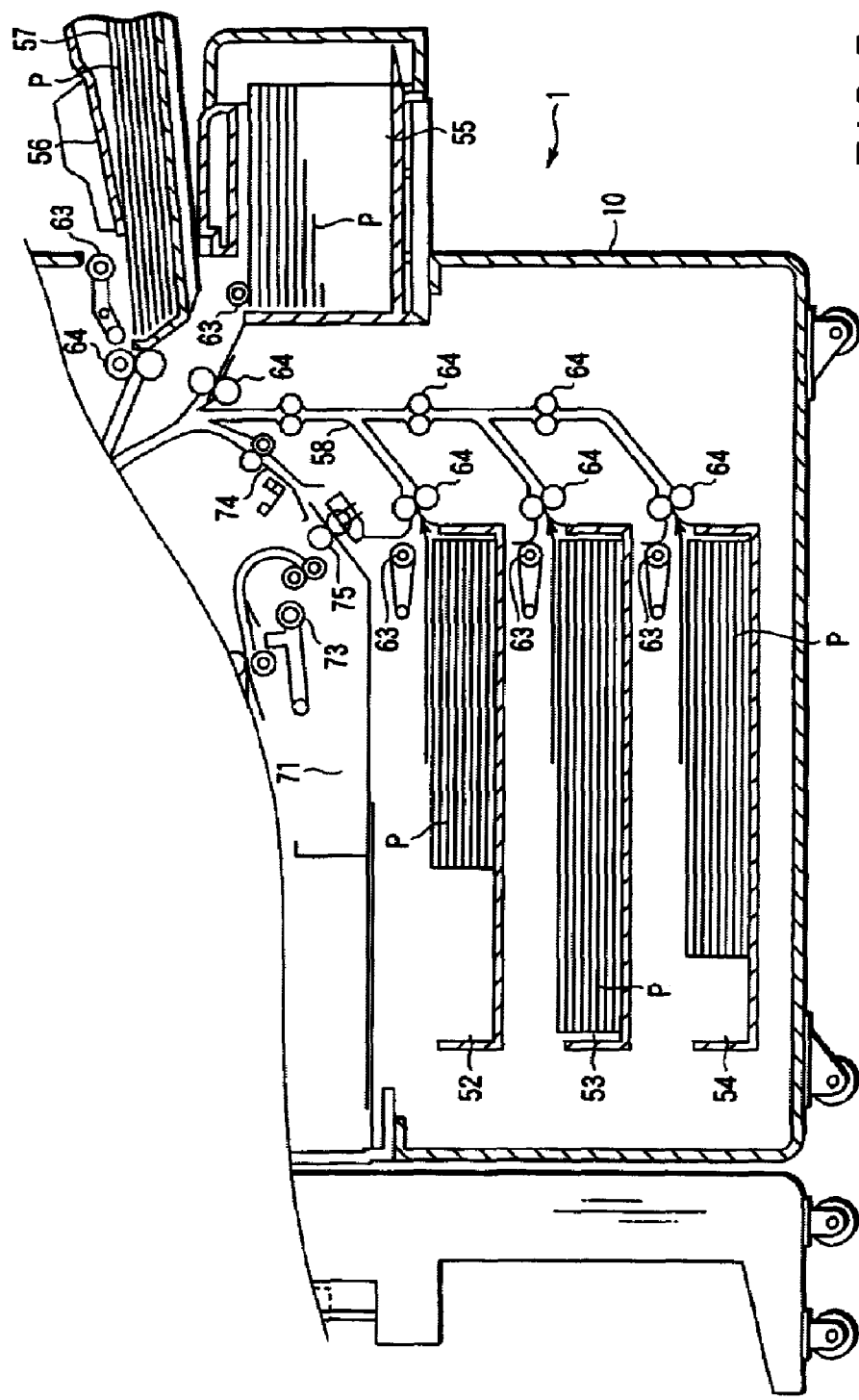

FIGS. 6, 7 are internal configuration views for illustrating the color digital copying apparatus.

On the upper portion of an apparatus main body 10, an automatic document feeder (ADF) 17 which is also used as a document cover and automatically feeds sheet-like documents one by one is provided so as to be freely set into an open/closed state. On the front upper portion of the apparatus main body 10, an operation panel (not shown) having various display units and various operation keys used to specify a copy condition and start of the copying process is provided.

On a portion of the apparatus main body 10 lying near the mounting portion of the ADF 17, a detector 100 which detects the open/closed state of the ADF 17 is provided. The detector 100 is also used to detect the open/closed state of a platen when the platen is set instead of the ADF 17.

On the right side portion of the apparatus main body 10, a paper cassette 57 which can store a small amount of paper and a large-capacity paper cassette 55 which can store a large amount of paper are removably mounted. The paper cassette 57 includes a tray 56 used for manual paper-feeding.

In the lower portion of the apparatus main body 10, paper cassettes 52, 53, 54 are removably mounted. On the left side portion of the apparatus main body 10, a finisher 80 used to receive sheets of copied paper is provided.

In the apparatus main body 10, a scanner mechanism section 112 of the scanner 1 which is used as acquiring means for acquiring image data in order to realize copying function and facsimile function and a printing mechanism section 115 of the color printer 2 used as image forming means are provided.

On the upper surface of the apparatus main body 10, a document table 13, which is configured by a transparent glass plate on which an object to be read, that is, a document D is placed, and the ADF 17 used to automatically feed a document onto the document table 13 are arranged. The ADF 17 is arranged to be freely set into an open/closed state with respect to the document table 13 and also functions as a document cover which closely presses the document D placed on the document table 13 against the document table 13.

The ADF 17 includes a document tray 8 on which documents D are set, an empty sensor 9 which detects the presence/absence of at least one document, a pickup roller 14 which takes out the documents D one by one from the document tray 8, a paper feeding roller 15 which feeds the taken-out document D, and an aligning roller pair 16 which aligns the front end of the document D. Further, it includes an aligning sensor (not shown) which is disposed on the upstream side with respect to the aligning roller pair 16 to detect arrival of the document D, a size sensor (not shown) which detects the size of the document D, and a conveyor belt 18 arranged to cover substantially the whole portion of the document table 13. A plurality of documents set with the face up on the document tray 8 are sequentially taken out from the bottom page, that is, final page and the taken-out document is aligned by the aligning roller pair 16 and fed to a preset position on the document table 13 by the conveyor belt 18.

In the ADF 17, on the end portion opposite to the aligning roller pair 16 with respect to the conveyor belt 18, a reversing roller 20, non-reverse sensor 21, flapper 22 and paper discharging roller 23 are arranged. The document D whose image information is read by the color scanner section 1 which will be described later is fed out from the document table 13 by the conveyor belt 18 and discharged onto a document discharging section 24 on the upper surface of the ADF 17 via the reversing roller 20, flapper 22 and paper discharging roller 23.

When the rear surface of the document D is read, the position of the flapper 22 is switched and the document D fed by the conveyor belt 18 is reversed by the reversing roller 20 and then fed to a preset position on the document table 13 by the conveyor belt 18 again.

The ADF 17 further includes a paper feeding motor which drives the pickup roller 14, paper feeding roller 15 and aligning roller pair 16 and a feed motor which drives the conveyor belt 18, reversing roller 20 and paper discharging roller 23.

The color scanner section 1 arranged in the apparatus main body 10 includes a light source 25 such as a fluorescent light which illuminates the document D placed on the document table 13, and a first mirror 26 which deflects light reflected from the document D in a preset direction. The light source 25 and first mirror 26 are mounted on a first carriage 27 disposed below the document table 13. On the first carriage 27, a size sensor 28 which detects the size of the document placed on the document table 13 is mounted. The first carriage 27 is arranged to move parallel to the document table 13 and is reciprocally moved below the document table 13 by a driving motor via a toothed belt (not shown) and the like.

Further, below the document table 13, a second carriage 29 which is movable parallel to the document table 13 is arranged. On the second carriage 29, second and third mirrors 30, 31 which sequentially deflect light reflected from the document D and deflected by the first mirror 26 are mounted at right angles to each other. The second carriage 29 is driven to follow the first carriage 27 by means of a toothed belt and the like which drive the first carriage 27 and moved in parallel to the document table 13 at a speed which is ½ times that of the first carriage 27.

Below the document table 13, an image forming lens 32 which focuses reflected light from the third mirror 31 on the second carriage 29 and a CCD sensor 34 which receives reflected light focused by the image forming lens 32 and photoelectrically converts the light are arranged. The image forming lens 32 is arranged to be movable in a plane which contains an optical axis of light deflected by the third mirror 31 by use of a driving mechanism and forms an image according to the reflected light at a desired magnification by its own movement. Then, the CCD sensor 34 photoelectrically converts the incident reflected light and outputs an electrical signal corresponding to the read image of the document D. The CCD sensor 34 includes three line sensors which output image data items of red (R), green (G), blue (B).

The color printer section 2 includes a laser exposure device 40 which acts as exposing means. The laser exposure device 40 includes a semiconductor laser 41 used as a light source, a polygon mirror 36 used as a scanning member which continuously deflects laser light emitted from the semiconductor laser 41, a polygon motor 37 used as a scanning motor which drives and rotates the polygon mirror 36 at a preset rotation speed as will be described later and an optical system 42 which deflects laser light from the polygon mirror 36 and directs the same to photosensitive drums 44a to 44d as will be described later. The laser exposure device 40 with the above configuration is fixed on and supported by a supporting frame (not shown) of the apparatus main body 10.

The semiconductor laser 41 is ON/OFF-controlled according to image information of the document D read by the color scanner section 1 to emit laser light. The laser light is directed toward the photosensitive drums 44a to 44d via the polygon mirror 36 and optical system 42 and scans the outer surfaces of the photosensitive drums 44a to 44d to form electrostatic latent images on the outer surfaces of the respective photosensitive drums 44a to 44d.

The image forming section 12 includes the freely rotatable photosensitive drums 44a to 44d used as image carriers which are arranged in substantially the central portion of the apparatus main body 10. The outer surfaces of the photosensitive drums 44a to 44d are exposed by the laser light from the laser exposure device 40 and desired electrostatic latent images are formed on the outer surfaces of the photosensitive drums 44a to 44d.

Electric chargers 45, . . . which produce preset charges on the outer surfaces of the photosensitive drums 44a to 44d, developing devices 46, . . . which supply toner as developing agents to the electrostatic latent images formed on the outer surfaces of the photosensitive drums 44a to 44d and develop the electrostatic latent images at desired image densities, separation chargers 47, . . . which separate a material to be copied (recording medium), that is, a sheet of copy paper P fed from one of the paper cassettes 52, 53, 54, 55 and 57 from the respective photosensitive drums 44a to 44d, transfer chargers 48, . . . which transfer toner images formed on the photosensitive drums 44a to 44d onto the copy paper P, separation claws (not shown) which separate the copy paper P from the outer surfaces of the respective photosensitive drums 44a to 44d, cleaning devices 50, . . . which eliminate toner remaining on the outer surfaces of the photosensitive drums 44a to 44d, and discharging devices 51, . . . which discharge the outer surfaces of the photosensitive drums 44a to 44d are sequentially arranged in this order around the photosensitive drums 44a to 44d, respectively.

Image forming units 45*a* to 45*d* are respectively configured by the photosensitive drums 44*a* to 44*d* and the devices respectively arranged around the drums.

In the example of this invention, in order to superpose four color images of Y image, M image, C image and BK image, the image forming units 45*a* to 45*d* are arranged in an order of Y, M, C, BK from the upstream side of a direction in which a desired point on the conveyor belt 67 is moved, that is, the copy paper P is fed.

In the lower portion of the apparatus main body 10, the paper cassettes 52, 53, 54 which can be withdrawn from the apparatus main body 10 are arranged in a stack form and sheets of copy paper of different sizes are loaded in the paper cassettes 52, 53, 54. The large-capacity paper cassette 55 is provided beside the paper cassettes 52, 53, 54 and sheets of copy paper with a size frequency used, for example, approximately 3000 sheets of copy paper of A4-size are stored in the large-capacity paper cassette 55. Further, the paper cassette 57 which is also used as the tray 56 for manual-feeding is removably mounted above the large-capacity paper cassette 55.

In the apparatus main body 10, a feeding path 58 which extends from each cassette through transfer sections lying between the photosensitive drums 44*a* to 44*d* and the transfer chargers 48 is formed and a fixing device 60 is disposed at the end of the feeding path 58. A discharging port 61 is formed in the side wall of the apparatus main body 10 which lies in opposition to the fixing device 60 and a finisher 80 is mounted on the discharging port 61.

Pickup rollers 63 each of which takes out sheets of copy paper one by one from a corresponding one of the cassettes are disposed near the paper cassettes 52, 53, 54, 55 and 57. Further, on the feeding path 58, a large number of paper feeding roller pairs 64 which feed the copy paper P taken out by the pickup roller 63 via the feeding path 58 are disposed.

A resist roller pair 65 is disposed on the upstream side of the feeding path 58 with respect to the photosensitive drums 44*a* to 44*d*. The resist roller pair 65 corrects the inclination of the taken-out copy paper P, sequentially aligns the front end of the copy paper P with the front ends of the toner images of the photosensitive drums 44*a* to 44*d* and feeds the copy paper P to the transfer section at the same speed as the moving speed of the outer surfaces of the photosensitive drums 44*a* to 44*d*. An aligning sensor 66 which detects arrival of the copy paper P is disposed in front of the resist roller pair 65, that is, on the paper feeding roller 64 side.

Sheets of copy paper P which are taken out one by one from one of the cassettes by the pickup roller 63 are fed to the resist roller pair 65 by use of the paper feeding roller pair 64. Then, after the front end of the copy paper P is aligned by the resist roller pair 65, the copy paper P is fed to the transfer section by the conveyor belt (transfer belt) 67.

In each of the transfer sections, a development image or toner image formed on a corresponding one of the photosensitive drums 44*a* to 44*d* is transferred onto the paper P by the corresponding transfer charger 48. The copy paper P having the toner image transferred thereon is separated from the outer surface of a corresponding one of the photosensitive drums 44*a* to 44*d* by the action of the separation charger 47 and separation claw (not shown) and fed to the fixing device 60 via the conveyor belt 67 which forms part of the feeding path 58. After the development image is melted and fixed on the copy paper P by the fixing device 60, the copy paper P is discharged onto the paper discharging tray 81 of the finisher 80 via the discharging port 61 by use of the paper feeding roller pair 68 and paper discharging roller pair 69.

Below the feeding path 58, an automatic double face setting device (ADD) 70 which reverses the copy paper P having passed through the fixing device 60 and feeds the same to the resist roller pair 65 again is provided. The automatic double face setting device 70 includes a temporary storage section 71 which temporarily stores copy paper P, a reversing path 72 which is branched from the feeding path 58, reverses the copy paper P having passed through the fixing device 60 and feeds the same to the temporary storage section 71, a pickup roller 73 which takes out sheets of copy paper P stored in the temporary storage section one by one, and a paper feeding roller 75 which feeds the taken-out copy paper to the resist roller pair 65 via the feeding path 74. A distribution gate 76 which selectively distributes the copy paper P to the discharging port 61 or reversing path 72 is provided in the branch portion between the feeding path 58 and the reversing path 72.

If the double face copying process is performed, the copy paper P having passed through the fixing device 60 is guided to the reversing path 72 by the distribution gate 76, temporarily stored in the temporary storage section 71 while it is kept in the reversed state, and then fed to the resist roller pair 65 via the feeding path 74 by means of the pickup roller 73 and paper feeding roller pair 75. After this, the copy paper P is aligned by the resist roller pair 65, fed to the transfer section again, and a toner image is transferred onto the rear surface of the copy paper P. Then, the copy paper P is discharged onto the paper discharging tray 81 of the finisher 80 via the feeding path 58, fixing device 60 and paper discharging roller 69.

Further, it is also possible to discharge the copy paper with the printed surface down by use of the automatic double face setting device 70. That is, in the same manner as in the case where the double face copying process is performed, first, an image is transferred onto and fixed on the front surface of the copy paper, then the copy paper is temporarily stored in the temporary storage section 71, fed to the resist roller pair 65 via the feeding path 74 by means of the pickup roller 73 and paper feeding roller pair 75, aligned by the resist roller pair 65 and finally discharged onto the paper discharging tray 81 of the finisher 80 via the feeding path 58, fixing device 60 and paper discharging roller 69.

Figure 8:
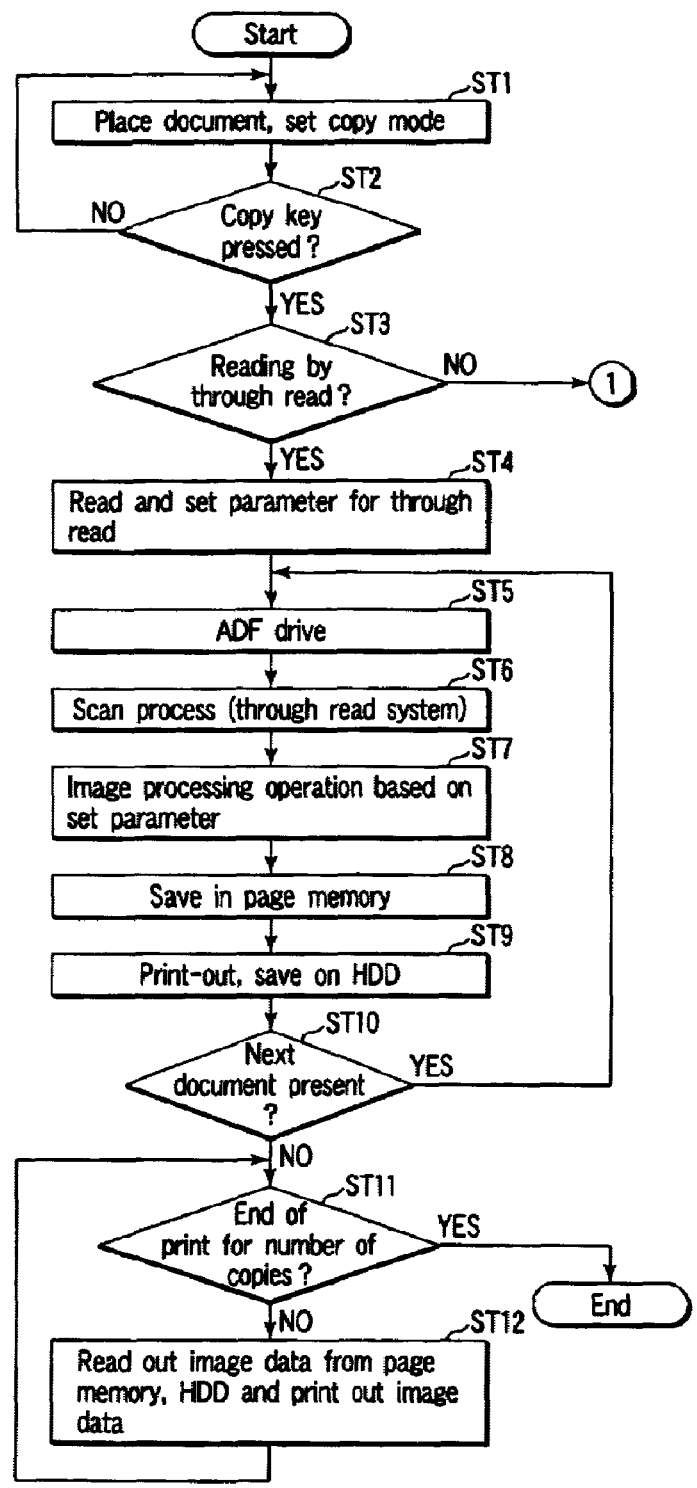
FIGS. 8, 9 are flowcharts for illustrating the image forming process performed by use of a through read system and document table fixed type system.
Figure 9:
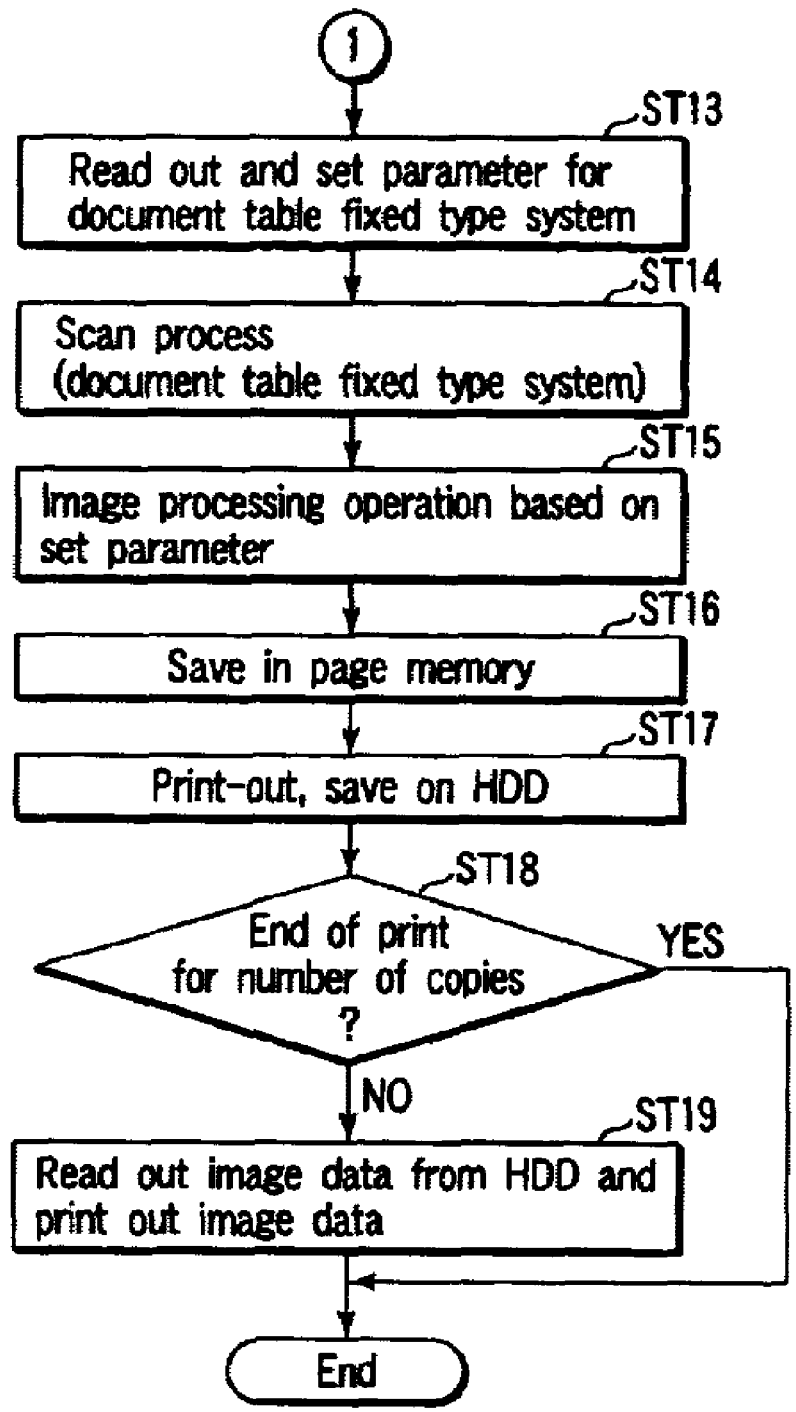

With the above configuration, the image forming process by use of the through read system and document table fixed type system is explained with reference to the flowcharts shown in FIGS. 8, 9.

First, the user places a document D on the document tray 8 of the ADF 17 or lifts the ADF 17 and manually places a document D on the document table 13 and sets another mode (copying condition) in which the density and the number of copies are set (ST1). Then, a copy key (not shown) is pressed (ST2). Based on the pressing of the copy key, the main CPU 116 checks the ON/OFF states of the empty sensor 9, size sensor 28 and detector 100 and determines a corresponding one of the reading systems based on the check results (ST3).

That is, if the empty sensor 9 is set in the ON state, the size sensor 28 is set in the OFF state and the detector 100 is set in the ON state, then the main CPU 116 determines reading of the document D by the through read system by use of the ADF 17.

Then, the main CPU 116 reads out parameters corresponding to the through read system from a memory 116*a* and sets the parameters in the respective processing sections (ST4).

For example, the process of the position correction processing section 121 is set in the ON state, the parameters corresponding to the through read system in the equation (1) are set in the color conversion section 122, the parameter (1) shown in FIG. 3 is set in the ground processing section 123, the parameter (1) shown in FIG. 4 is set in the filter processing section 124 and the parameter (1) shown in FIG. 5 is set in the gradation correction processing section 125.

In this state, in the color scanner section 1, the ADF 17 is driven and controlled to feed the document D in a direction which intersects with the scanning lines by the light source 25 (CCD sensor 34) (ST5) while the first carriage 27 and second carriage 29 on which the optical system including the light source 25 is mounted are kept fixed in the home position or in a preset document reading position.

As a result, image data items of red, green, blue of the document D are read by the CCD sensor 34 of the color scanner section 1 (ST6).

The image data items of red, green, blue of the document D read by the color scanner section 1 are subjected to color processing operation by the image processing section 118 (ST7) and then developed on the page memory 127 (ST8). The image data items of the respective colors developed on the page memory 127 are subjected to mirror-image conversion, output to the printer section 12, printed in the color printer section 2, compressed by an image compression/expansion section (not shown) and registered in an HDD (not shown).

The documents placed on the document tray 8 are sequentially processed in the same manner as described above (ST5 to ST9).

If the CPU 116 determines that no document is present by detecting the OFF state of the empty sensor 9 (ST10), it terminates the reading process by the color scanner section 1 and causes a set number of copies to be printed (ST11, ST12).

Further, in the step ST3, if the empty sensor 9 is set in the OFF state and the size sensor 28 is set in the ON state (in this case, the detector 100 may be set in the ON state or OFF state), the main CPU 116 determines reading of the document D by the document table fixed type system by use of the ADF 17.

Then, the main CPU 116 reads out parameters corresponding to the document table fixed type system from the memory 116a and sets the parameters in the respective processing sections (ST13).

For example, the process of the position correction processing section 121 is set in the OFF state, the parameters corresponding to the document table fixed type system in the equation (1) are set in the color conversion section 122, the parameter (2) shown in FIG. 3 is set in the ground processing section 123, the parameter (2) shown in FIG. 4 is set in the filter processing section 124 and the parameter (2) shown in FIG. 5 is set in the gradation correction processing section 125.

In this state, in the color scanner section 1, the first carriage 27 and second carriage 29 on which the optical system including the light source 25 is mounted are moved along the document table 13 to perform the reading/scanning operation (ST14).

As a result, image data items of red, green, blue of the document D are read by the CCD sensor 34 of the color scanner section 1 (ST14).

The image data items of red, green, blue read by the color scanner section 1 are subjected to the color processing operation by the image processing section 118 (ST15) and then developed on the page memory 127 (ST16). The image data items of the respective colors developed on the page memory 127 are output to the color printer section 2, printed in the color printer section 2, compressed by an image compression/expansion section (not shown) and stored on an HDD (not shown) (ST17).

If a plurality of prints to be made are set, prints of a set number are made (ST18, ST19).

The image processing operation in the image processing section 118 when the document is read by use of the through read system as described before is explained below.

That is, the position correction processing section 121 subjects image data of red, green, blue supplied from the color scanner section 1 to the position correction process and then supplies the thus corrected image data to the color conversion section 122.

The color conversion section 122 corrects variation in color caused by, for example, floating of paper with respect to the image data supplied from the position correction processing section 121. The color conversion section 122 converts image data of red (R), green (G), blue (B) into image data of cyan (C), magenta (M), yellow (Y), black (BK) by use of the parameter corresponding to the through read system, and at the same time, it corrects the color drift and, for example, it corrects a reddish achromatic color (white, black) to gray or corrects a dark color into a bright color. Image data output from the color conversion section 122 is supplied to the ground processing section 123.

The ground processing section 123 eliminates fog (vagueness) of the ground which occurs due to floating of the document from the image data supplied from the color conversion section 122. As shown in FIG. 3, as correction in the ground processing section 123, various corrections can be made depending on the situation, but in this case, the correction processes for the respective colors are performed by use of the same parameter so as to maintain the color balance by taking it into consideration that color correction has been made in the color conversion section 122. For example, (1) is selected in the through read system. Image data output from the ground processing section 123 is supplied to the filter processing section 124.

The filter processing section 124 performs the filter process to enhance sharpness and eliminate moire by use of the parameter corresponding to the through read system. Image data output from the filter processing section 124 is supplied to the gradation correction processing section 125.

The gradation correction processing section 125 makes a correction of the gradation characteristic which could not be corrected by the processing blocks in the preceding stage of the gradation correction processing section 125 and a correction of the γ characteristic of the color printer section 2 with respect to image data supplied from the filter processing section 124 by use of the parameter corresponding to the through read system. Image data output from the gradation correction processing section 125 is supplied to the gradation processing section 126.

The gradation processing section 126 subjects image data supplied from the gradation correction processing section 125 to the gradation process such as a full-line process, dither process or error dispersing process which can serve the desired purpose. Image data output from the gradation processing section 126 is supplied to the page memory 127.

Next, the image processing operation in the image processing section 118 when the document is read by use of the document table fixed type system is explained below.

That is, the position correction processing section 121 passes image data of red, green, blue supplied from the color scanner section 1 therethrough and supplies the same to the color conversion section 122.

The color conversion section 122 corrects a variation in color caused by, for example, floating of paper with respect to the image data supplied from the position correction processing section 121. The color conversion section 122 converts image data of red (R), green (G), blue (B) into image data of cyan (C), magenta (M), yellow (Y), black (BK) by use of the parameter corresponding to the document table fixed type system, and at the same time, it corrects the color drift and, for example, it corrects a reddish achromatic color (white, black) to gray or corrects a dark color into a bright color. Image data output from the color conversion section 122 is supplied to the ground processing section 123.

The ground processing section 123 eliminates fog (vagueness) of the ground which occurs due to floating of the document from the image data supplied from the color conversion section 122. As shown in FIG. 3, as correction in the ground processing section 123, various corrections can be made depending on the situation, but in this case, the correction processes for the respective colors are performed by use of the same parameter so as to maintain the color balance by taking into consideration that color correction has been made in the color conversion section 122. For example, (2) is selected in the document table fixed type system. Image data output from the ground processing section 123 is supplied to the filter is processing section 124.

The filter processing section 124 performs the filtering process to enhance sharpness and eliminate moire by use of the parameter corresponding to the document table fixed type system. Image data output from the filter processing section 124 is supplied to the gradation correction processing section 125.

The gradation correction processing section 125 makes a correction of the gradation characteristic which could not be corrected by the processing blocks in the preceding stage of the gradation correction processing section 125 and a correction of the γ characteristic of the color printer section 2 with respect to image data supplied from the filter processing section 124 by use of the parameter corresponding to the document table fixed type system. Image data output from the gradation correction processing section 125 is supplied to the gradation processing section 126.

The gradation processing section 126 subjects image data supplied from the gradation correction processing section 125 to the gradation process such as a full-line process, dither process or error dispersing process which can serve the desired purpose. Image data output from the gradation processing section 126 is supplied to the page memory 127.

As described above, even in a case where different reading systems such as the through read system and document table fixed type system are selectively used to read a color document, it is possible to provide a system which can acquire the same output irrespective of the reading system by previously storing different parameters for the respective reading systems used at the image processing time and performing the image processing operation by use of the parameter corresponding to the reading system.

That is, in order to correct variations in image density, color reproduction, sharpness and the like, the variations are absorbed (suppressed) and corrected by use of a plurality of image processing blocks (color conversion section, ground processing section, filter processing section, gradation correction processing section) mounted on the apparatus. A system can be provided in which the same (print) output can be acquired irrespective of the input system when a color document is read by changing the parameters of the plurality of image processing blocks although it takes a long time to make a parameter design. Therefore, the same result can always be attained even when the same document is copied or input by use of different input methods and an apparatus which the user can easily deal with can be provided.

Further, when image data supplied from the color scanner section 1 to the image processing section 118 is output to a personal computer (PC) or the like, it is possible to output the output data of any one of the image processing blocks (color conversion section, ground processing section, filter processing section, gradation correction processing section, gradation processing section) to the PC.

It is not necessary to perform the process up to the process by the gradation processing section, but according to the object of this invention, the results obtained by inputting input data by use of a plurality of different input methods become the same by outputting output data obtained after the gradation correction process to the PC and a preferable output can be attained.

Further, although not contained in the image processing operation described above, for example, other processing blocks used in a normal image processing operation such as a shading correction process, RGB correction process, identification process may be adequately added. In addition, even if the arrangement of the processing blocks is changed or part of the processing flow is omitted, the same operation can be attained by making the configuration which achieves the object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a reading section which has first reading function of reading an image of a document fed and second reading function of moving along a document placed on a document table to read an image of the document,
determining means for determining whether the document is read by use of the first reading function of said reading section or the second reading function of said reading section,
a correcting section which corrects image data acquired by use of the first reading function of said reading section based on first correction data which is previously stored when said determining means determines that the document is read by use of the first reading function of said reading section and corrects image data acquired by use of the second reading function of said reading section based on second correction data which is previously stored when said determining means determines that the document is read by use of the second reading function of said reading section, and
an image forming section which forms an image based on image data corrected by said correcting section.

2. An image forming apparatus according to claim 1, wherein the first reading function is a through read system and the second reading function is a document table fixed type system.

3. An image forming apparatus according to claim 1, wherein said correcting section is a color conversion section which converts image data obtained by use of the first and second reading functions of said reading section to a color signal and corrects a variation in color by selectively using color conversion parameters which are different at the time of reading by the first reading function and at the time of reading by the second reading function.

4. An image forming apparatus according to claim 3, wherein said reading section reads a color document and outputs image data which is color-separated into a plurality of colors (R, G, B) and said color conversion section color-converts (C, M, Y, BK) the color-separated image data output from said reading section to convert the image data to different image data.

5. An image forming apparatus according to claim 1, wherein said correcting section is a ground processing section which corrects the ground of image data obtained by the first and second reading functions of said reading section and corrects a fog of the ground by selectively using ground processing parameters which are different at the time of reading by the first reading function and at the time of reading by the second reading function.

6. An image forming apparatus according to claim 1, wherein said correcting section is a filter section which performs a filter process for image data obtained by the first and second reading functions of said reading section and corrects a frequency characteristic by selectively using filters which are different at the time of reading by the first reading function and at the time of reading by the second reading function.

7. An image forming apparatus according to claim 1, wherein said correcting section is a gradation correcting section which subjects image data obtained by the first and second reading functions of said reading section to gradation correction and performs the gradation correction by selectively using parameters which are different at the time of reading by the first reading function and at the time of reading by the second reading function.

8. An image forming apparatus according to claim 1, wherein said correcting section is at least one of a color conversion section which converts image data obtained by the first and second reading functions of said reading section to a color signal, a ground processing section which corrects the ground of image data obtained by the first and second reading functions of said reading section, a filter section which performs a filter process for image data obtained by the first and second reading functions of said reading section and a gradation correcting section which corrects the gradation of image data obtained by the first and second reading functions of said reading section and makes a correction by selectively using parameters which are different at the time of reading by the first reading function and at the time of reading by the second reading function.

9. An image forming apparatus according to claim 1, wherein said correcting section a position correcting section which corrects a reading position of image data obtained by the first reading function of said reading section at the time of reading by the first reading function, a color conversion section which selectively converts one of image data obtained from said position correcting section at the time of reading by the first reading function and image data obtained from said reading section at the time of reading by the second reading function to a color signal by selectively using a corresponding one of different parameters, a ground processing section which corrects the ground of the color signal from said color conversion section by selectively using level adjusting data items which are different at the time of reading by the first reading function and at the time of reading by the second reading function, a filter section which corrects the color signal from said ground processing section by selectively using filters having filter coefficients which are different at the time of reading by the first reading function and at the time of reading by the second reading function, and a gradation correcting section which corrects the gradation of the color signal from said filter section by selectively using parameters which are different at the time of reading by the first reading function and at the time of reading by the second reading function.

10. An image forming apparatus comprising:
a first reading section which reads an image of a document fed,
a second reading section which moves along a document placed on a document table to read an image of the document,
determining means for determining whether the document is read by use of said first reading section or said second reading section,
a correcting section which corrects image data acquired by use of said first reading section based on first correction data which is previously stored when said determining means determines that the document is read by use of said first reading section and corrects image data acquired by use of said second reading section based on second correction data which is previously stored when said determining means determines that the document is read by use of said second reading section, and
an image forming section which forms an image based on image data corrected by said correcting section.

11. An image forming apparatus comprising:
a reading section which has first reading function of reading a document image fed and second reading function of moving along a document placed on a document table to read an image of the document,
determining means for determining whether the document is read by use of the first reading function of said reading section or the second reading function of said reading section, and
a correcting section which corrects image data acquired by use of the first reading function of said reading section based on first correction data which is previously stored when said determining means determines that the document is read by use of the first reading function of said reading section and corrects image data acquired by use of the second reading function of said reading section based on second correction data which is previously stored when said determining means determines that the document is read by use of the second reading function of said reading section.

* * * * *